(12) United States Patent
Machauer et al.

(10) Patent No.: US 10,216,687 B2
(45) Date of Patent: Feb. 26, 2019

(54) SUBSCRIBER STATION FOR A BUS SYSTEM, AND METHOD FOR INCREASING THE DATA RATE OF A BUS SYSTEM

(71) Applicant: Robert Bosch GmbH, Stuttgart (DE)

(72) Inventors: Ralf Machauer, Ludwigsburg (DE); Simon Weissenmayer, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/119,210

(22) PCT Filed: Jan. 22, 2015

(86) PCT No.: PCT/EP2015/051232
§ 371 (c)(1),
(2) Date: Aug. 16, 2016

(87) PCT Pub. No.: WO2015/121043
PCT Pub. Date: Aug. 20, 2015

(65) Prior Publication Data
US 2017/0011000 A1    Jan. 12, 2017

(30) Foreign Application Priority Data
Feb. 17, 2014 (DE) .................. 10 2014 202 826

(51) Int. Cl.
*G06F 11/07* (2006.01)
*G06F 13/42* (2006.01)
(Continued)

(52) U.S. Cl.
CPC ........ *G06F 13/4282* (2013.01); *G06F 11/079* (2013.01); *G06F 11/0745* (2013.01);
(Continued)

(58) Field of Classification Search
None
See application file for complete search history.

(56) References Cited

U.S. PATENT DOCUMENTS

| | | | | |
|---|---|---|---|---|
| 4,922,486 A | * | 5/1990 | Lidinsky ................ | H04L 12/56 340/5.74 |
| 5,459,836 A | * | 10/1995 | Whittaker ............ | G06F 15/167 709/213 |

(Continued)

FOREIGN PATENT DOCUMENTS

| DE | 100 00 305 A1 | 7/2001 |
|---|---|---|
| DE | 10 2012 200 997 A1 | 2/2013 |
| WO | 01/45317 A2 | 6/2001 |

OTHER PUBLICATIONS

International Search Report corresponding to PCT Application No. PCT/EP2015/051232, dated May 4, 2015 (German and English language document) (5 pages).

(Continued)

*Primary Examiner* — Elias Mamo
(74) *Attorney, Agent, or Firm* — Maginot, Moore & Beck LLP

(57) ABSTRACT

The disclosure relates to a participant station for a bus system and to a method for increasing the data rate of a bus system. The participant station comprises a device for receiving a message from at least one other participant station of the bus system via the bus system. In the bus system, an exclusive collision-free access of a participant station to a bus line of the bus system is ensured at least temporarily. The participant station also comprises a testing device for testing whether or not the received message is specified for the participant station and an error processing device for processing errors of the received message only when the test carried out by the testing device indicates that the received message is specified for the participant station.

8 Claims, 3 Drawing Sheets

(51) Int. Cl.
*H04L 1/00* (2006.01)
*H04L 12/40* (2006.01)
*H04L 12/26* (2006.01)

(52) U.S. Cl.
CPC ...... *H04L 1/0053* (2013.01); *H04L 12/40032* (2013.01); *H04L 43/0847* (2013.01); *H04L 1/0061* (2013.01); *H04L 2001/0094* (2013.01); *H04L 2012/40215* (2013.01); *H04L 2012/40273* (2013.01)

(56) References Cited

U.S. PATENT DOCUMENTS

| | | | |
|---|---|---|---|
| 5,469,150 A | 11/1995 | Sitte | |
| 5,600,782 A * | 2/1997 | Thomson | H04L 12/40013 714/4.21 |
| 6,675,324 B2 * | 1/2004 | Marisetty | G06F 11/2242 714/10 |
| 8,713,350 B2 * | 4/2014 | Walton | G06F 11/0712 714/1 |
| 8,855,071 B1 * | 10/2014 | Sankaran | H04W 76/021 370/329 |
| 2004/0150516 A1 | 8/2004 | Faetanini | |
| 2013/0013806 A1 * | 1/2013 | Woo | H04L 5/06 709/238 |

OTHER PUBLICATIONS

Florian Hartwich, CAN with Flexible Data-Rate, 8 pages.
Hans Sitte, Sensor-Actuator Bus, Scientific Honeyweller, vol. 11, No. 1, Fall 1991, pp. 41-47, Minneapolis, MN, US.

\* cited by examiner

SUBSCRIBER STATION FOR A BUS SYSTEM, AND METHOD FOR INCREASING THE DATA RATE OF A BUS SYSTEM

This application is a 35 U.S.C. § 371 National Stage Application of PCT/EP2015/051232, filed on Jan. 22, 2015, which claims the benefit of priority to Serial No. DE 10 2014 202 826.4, filed on Feb. 17, 2014 in Germany, the disclosures of which are incorporated herein by reference in their entirety.

The present disclosure relates to a subscriber station for a bus system and to a method for increasing the data rate of a bus system, in which data transmission errors do not result in the transmission of data being terminated by subscriber stations which are not involved in the transmission of data.

BACKGROUND

For communication between sensors and control devices, the CAN bus system has found widespread acceptance. In the case of the CAN bus system, messages are transmitted using the CAN protocol, as described in the CAN specification in ISO11898. As the number of intelligent sensors increases and the control devices are networked more intensively in the vehicle, the number of subscriber stations on the CAN bus and the volume of data on the CAN bus are increasing more and more.

DE10 000 305 A1 describes the CAN (Controller Area Network) and an extension of the CAN which is referred to as TTCAN (Time Trigger CAN). The media access control method used in the CAN is based on bitwise arbitration.

In the case of CAN, the bitwise arbitration is carried out on the basis of a leading identifier inside the message to be transmitted via the bus.

As already described in DE 10 2012 200 997, a plurality of subscriber stations can simultaneously transmit data via the bus system during the bitwise arbitration without thereby interfering with the transmission of data.

Recently, technologies have been proposed, for example CAN-FD in which messages are transmitted according to the specification "CAN with Flexible Data-Rate, Specification Version 1.0" (source http://www.semiconductors.bosch.de), etc. In the case of such technologies, the maximum possible data rate is increased above a value of 1 Mbit/s by using higher clocking in the region of the data fields. CAN-FD makes it possible to increase the data rate for systems in which the data rate was previously limited by the bus length of the systems.

The bus topology plays a significant role in the reflection-free and therefore fast transmission of data. Ideally, there are only two CAN subscriber stations on the CAN bus. In this case, the bus ends can be ideally terminated and line reflections can be avoided. In order to save transmission cables and to actually be able to use the advantages of the CAN protocol, it is desirable in practice, however, to connect as many CAN subscriber stations as possible to a bus.

However, the problem is that reflections are produced in the transmission of data at each branch of the data lines. These reflections are superimposed on the original signals and interfere with the reception by the receivers. The greater the reflections, the slower the data rate must be selected in order to still be able to reliably transmit the signal.

In order to ensure reliable transmission, the CAN protocol provides error handling. According to error handling, each CAN subscriber station checks all signals on the CAN bus and terminates the transmission with an error frame if an error is identified. Even the CAN subscriber stations which are not involved in communication, because they do not further process the signals transmitted via the CAN bus for example, intervene in the communication between the transmitter and the receiver.

The interference signals occurring on the CAN bus have a different effect on the CAN subscriber stations. The influence of the interference is greater, the more strongly the useful signal is attenuated in comparison with the interference. It is generally the case that the shorter the line between the interference source and the receiver and the longer the line between the transmitter and the receiver, the worse the signal quality. As a result, the situation may occur in which the receiver could receive the signal without any errors, whereas a CAN subscriber station not involved in communication identifies an error and destroys the signal by an error message. This results in the transmitter having to transmit the signal again, which unnecessarily increases the bus load on the CAN bus and unnecessarily slows down the transmission of data.

In order to be able to reliably detect an erroneous signal, the evaluation of the CRC signal is sufficient in most cases.

In addition, it is possible to achieve an even higher data rate by transmitting the data inside the CAN frame in a similar manner to data transmission protocols, for example Ethernet. However, such protocols currently cannot be readily used.

Another problem is that the times at which one bit is intended to be sampled is set for each individual subscriber station when designing a CAN network or bus system. This setting is also referred to as bit timing. Depending on the subscriber station from which the signal is received, other times are optimal for error-free reception. However, the times cannot be varied on the basis of the transmitting subscriber station. Therefore, a compromise for the best times must be found when designing a CAN network or bus system by taking into account all subscriber stations. In particular, when designing a network having a plurality of CAN-FD subscribers, it is difficult to set the times in such a manner that all subscribers can receive the signal without errors. If a suitable time cannot be found, the data rate of the bus must be reduced as a solution to this.

SUMMARY

The object of the present disclosure is to provide a subscriber station for a bus system and a method which solve the problems mentioned above. In particular, the intention is to provide a subscriber station for a bus system and a method in which interference on the CAN bus does not increase the bus load on the CAN bus and therefore does not reduce the data rate of the transmission of data and in which the design of the CAN network or bus system is simplified.

The object is achieved by means of a subscriber station for a bus system according to the disclosure. The subscriber station comprises a device for receiving a message from at least one further subscriber station of the bus system via the bus system, in which bus system exclusive, collision-free access of a subscriber station to a bus line of the bus system is ensured at least temporarily, a checking device for checking whether or not the received message is intended for the subscriber station, and an error handling device for 5handling errors in the received message only if the check by the checking device reveals that the received message is intended for the subscriber station.

In the subscriber station, signals which can be correctly received by particular receivers are prevented from being destroyed by subscriber stations which are not involved in the transmission of data. As a result, a wider use of CAN-FD and a higher maximum data rate on a CAN bus than before are achieved. In addition, the design of a CAN network or bus system is simplified since it is no longer necessary to carry out bit timing with the subscriber station.

The subscriber station is therefore also suitable for use in systems with higher clocking, for example CAN-FD, etc. The previously described subscriber station is suitable for the use of CAN-FD even in applications in which it was previously not possible to increase the data rate further. Such applications are, for example, bus topologies in which CAN-FD previously could not be used on account of line reflections. In many cases, it is sufficient to configure only those subscriber stations which are particularly strongly affected by line reflections in the manner described above.

In addition, the subscriber station described above can be used to increase the maximum transmittable data rate in CAN-FD.

Another advantage is that the subscriber station described above can be used to increase the data rate in a considerably simpler manner by transmitting messages in a similar manner to other data transmission protocols, for example Ethernet, etc.

In addition, the subscriber station described above is very advantageous in applications, so-called off-highway applications, in which more and more subscriber stations are gradually connected to the bus line by different manufacturers. With the subscriber station which carries out the selective error handling described, the bus system is more robust with respect to the subsequent connection of further subscriber stations.

The checking device can be configured to check whether the received message has a predetermined bit pattern which comprises the fact that the received message is intended for the subscriber station or is not intended for the subscriber station.

The checking device can also be configured to the effect that it carries out its check on the basis of the message identifier included in the received message. In this case, in one variant, the checking device can be configured to the effect that, during its check, it hides messages for the subscriber station which have or do not have a message identifier having a predetermined bit pattern.

The error handling device can be configured in such a manner that it does not carry out any error handling if the check by the checking device reveals that the received message is not intended for the subscriber station and outputs an error frame if the check by the checking device reveals that the received message is intended for the subscriber station and the error handling device identifies an error in the received message.

It is also possible for the checking device to be configured to output the message identifier of the subscriber station, which is included in the message, to a communication control device of the subscriber station in order to set times for sampling one bit of the message on the basis of the message identifier of the subscriber station which is included in the message.

The device is possibly a transmitting/receiving device which is also configured to transmit a message to at least one further subscriber station of the bus system via the bus system, the message having a predetermined bit pattern in the message identifier.

The subscriber station described above may be part of a bus system having a bus line and at least two subscriber stations which are connected to one another via the bus line in such a manner that they can communicate with one another. In this case, at least one of the at least two subscriber stations is a subscriber station described above.

The above-mentioned object is also achieved by means of a method for increasing the data rate of a bus system. The method comprises the steps of using a transmitting/receiving device of the subscriber station to receive a message from a further subscriber station of the bus system via the bus system, in which bus system exclusive, collision-free access of a subscriber station to a bus line of the bus system is ensured at least temporarily, using a checking device to check whether or not the received message is intended for the subscriber station, and using an error handling device to handle errors in the received message only if the check by the checking device reveals that the received message is intended for the subscriber station.

In the method, the checking device can use a memory device when switching the error handling device on and off, the memory device or a further memory device being used when the received message is being checked for the hiding of predetermined received messages for the subscriber stations for reasons other than for error handling.

The method provides the same advantages as those mentioned above with respect to the subscriber station.

Further possible implementations of the disclosure also comprise combinations (not explicitly mentioned) of features or embodiments described above or below with respect to the exemplary embodiments. In this case, a person skilled in the art will also add individual aspects as improvements or additions to the respective basic form of the disclosure.

BRIEF DESCRIPTION OF THE DRAWINGS

The disclosure is described in more detail below with reference to the accompanying drawing and using exemplary embodiments. In the drawing.

In the figures, identical or functionally identical elements are provided with the same reference symbols unless indicated otherwise.

DETAILED DESCRIPTION

Figure 1:
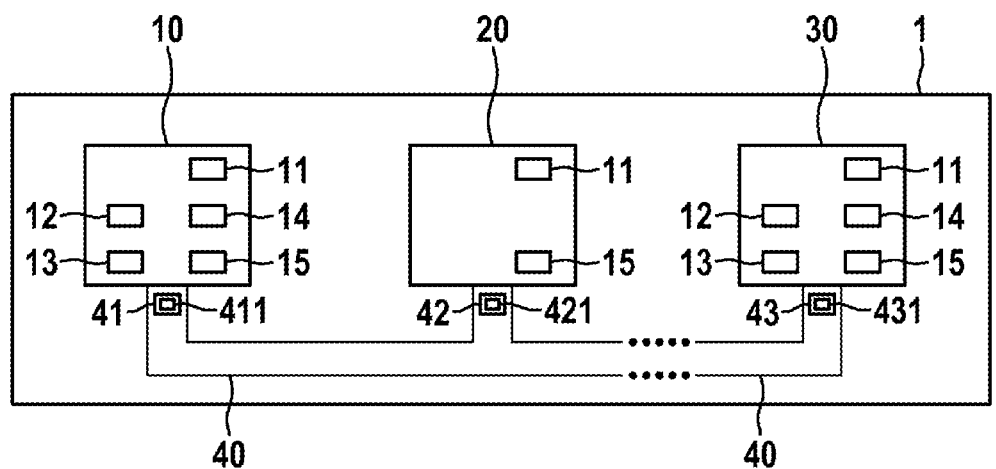
FIG. 1 shows a simplified block diagram of a bus system according to a first exemplary embodiment.

FIG. 1 shows a bus system 1 which may be, for example, a CAN bus system, a CAN-FD bus system, etc. The bus system 1 may be used in a vehicle, in particular a motor vehicle, an aircraft, etc., or in a hospital, etc.

In FIG. 1, the bus system 1 has a multiplicity of subscriber stations 10, 20, 30 which are each connected to a bus line 40. Messages 41, 42, 43 in the form of signals can be transmitted between the individual subscriber stations 10, 20, 30 via the bus line 40. The messages 41, 42, 43 each have one message identifier of message identifiers 411, 421, 431, which is also referred to as the CAN ID in CAN bus systems. The subscriber stations 10, 20, 30 may be, for example, control devices or display apparatuses or sensors of a motor vehicle.

As shown in FIG. 1, the subscriber station 10 has a communication control device 11, a checking device 12, a memory device 13, an error handling device 14 and a transmitting/receiving device 15. In contrast, the subscriber station 20 has a communication control device and a transmitting/receiving device 15. Like the subscriber station 10, the subscriber station 30 has a communication control device 11, a checking device 12, a memory device 13, an error handling device 14 and a transmitting/receiving device 15. The transmitting/receiving devices 15 of the subscriber stations 10, 20, 30 are each directly connected to the bus line 40, even if this is not illustrated in FIG. 1.

The communication control device 11 is used to control communication, via the bus line 40, between the respective subscriber station 10, 20, 30 and another subscriber station of the subscriber stations 10, 20, 30 connected to the bus line 40. The checking device 12, the memory device 13 and the error handling device 14 are used to increase the data rate on the bus line 40 for messages 41, 42, 43 received by the transmitting/receiving device 15 and to simplify the design of the bus system 1, as described in yet more detail below. The communication control device 11 may be designed like a conventional CAN controller. The transmitting/receiving device 15 may be designed like a conventional CAN transceiver with regard to its transmission functionality. Consequently, the data rate on the bus line 40 can be increased and the design of the bus system 1 can be simplified with the two subscriber stations 10, 30. In contrast, the subscriber station 20 corresponds to a conventional CAN subscriber station both with regard to its transmission functionality and with regard to its reception functionality.

In a CAN bus system, a plurality of subscriber stations 10, 20, 30 are active and emit their messages 41, 42, 43 with message identifiers 411, 421, 431. These message identifiers 411, 421, 431 are used for arbitration in the arbitration phase. After arbitration, only one subscriber station of the subscriber stations 10, 20, 30 transmits signals in the form of one or more of the messages 41, 42, 43 onto the bus line 40. From that moment on, each listening subscriber station 10, 20, 30 can observe the bus signals or messages 41, 42, 43.

If, for example, the transmitting/receiving device 15 of the subscriber station 10 receives a message 42, the checking device 12 of the subscriber station 10 uses the message identifier 421 contained in the message 42 to check whether or not the message 42 is intended for the subscriber station 10. In this case, the checking device compares the message identifier 421 of the received message 42 with one or more message identifiers stored in the memory device 13.

Figure 2:
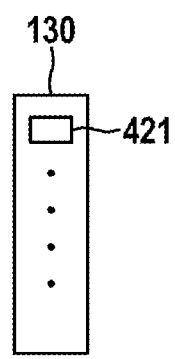
FIG. 2 shows an example of a list which is used by a subscriber station according to the first exemplary embodiment.

FIG. 2 shows a list 130 in which the message identifiers stored in the memory device 13 can be stored. The list 130 may also be in the form of an array, etc. In FIG. 2, only the message identifier 421 is stored in the present exemplary embodiment. If necessary, further message identifiers could also be stored in the list 130, as illustrated by the dots in the list 130. The list 130 indicates that the messages 42 from the subscriber station 20 are not intended for the subscriber station 10 and therefore should not be handled using the error handling device 14. In one modification of the present exemplary embodiment, the list 130 can also indicate that the messages 42 from the subscriber station 20 are intended for the subscriber station 10 and should therefore be handled using the error handling device 14.

The subscriber station 10 is therefore configured in such a manner that, although it receives the messages 42 from the subscriber station 20, it does not carry out any error handling for these messages. The error handling is carried out only for messages 43 from the subscriber station 30 and from other subscriber stations which are possibly present in the bus system 1 but are not illustrated here. In one modification of the present exemplary embodiment, the subscriber station 10 can also be configured in such a manner that it hides the messages from the subscriber station 20 for the subscriber station 10. As a result, the quantity of receive messages to be held in the subscriber station 10 can be kept as small as possible since not every message 42 is individually recorded in the memory device 13 of the subscriber station 10. Instead, entire identification regions are assigned to a subscriber station 10, 20, 30. In this case, particular messages which form a signal, the messages 42 in the subscriber station 10 in the present case, are hidden. As a result, the messages 42 are not stored in a memory device of the subscriber station 10 and no interruption of the data processing in the subscriber station 10 is triggered.

For example, the checking with the checking device 12, which can also be used for the hiding of the messages 42 described above, can be carried out by means of particular bit patterns in the message identifier such as, in particular, xxxx000xxxx for the message identifier 411 of the first subscriber station 10 as the first subscriber station of the bus system 1, xxxx001xxxx for the message identifier 421 of the subscriber station 20 as the second subscriber station of the bus system 1, and xxxx111xxxx for the message identifier 431 of the subscriber station 30 if the subscriber station 30 is the eighth subscriber station of the bus system 1, where x is any desired bit of the message identifier 411, 412, 413. If, using the list 130 in the memory device 13, the checking device 12 detects that the received message has the bit pattern xxxx001xxxx as the message identifier, the checking device 12 switches off the error handling device 14. After a period which is available for receiving the message 42 in the bus system 1, the checking device 12 switches the error handling device 14 on again. This is explained in more detail using FIG. 3.

Figure 3:
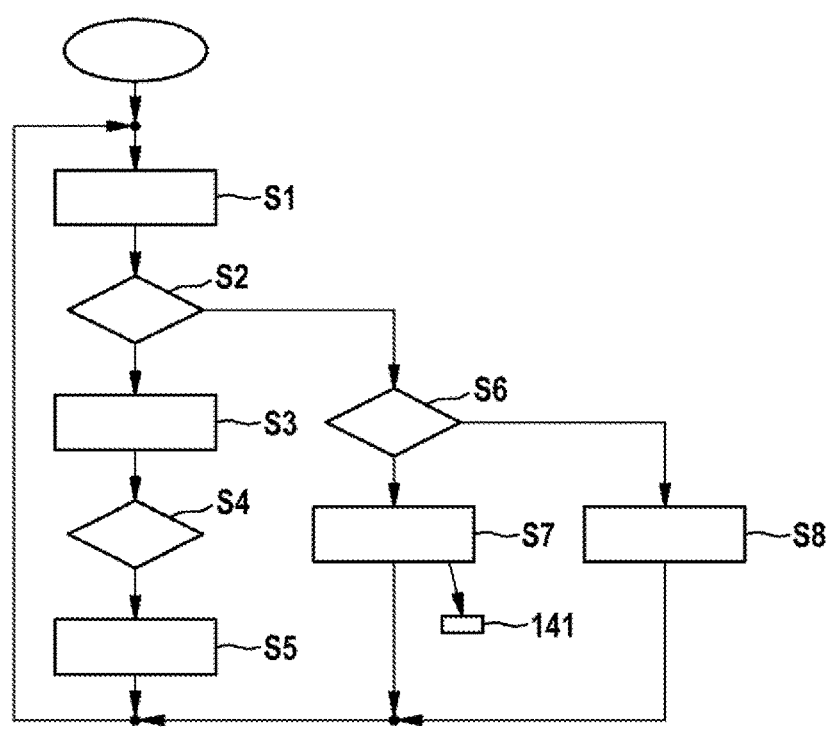
FIG. 3 shows a flowchart of a method according to the first exemplary embodiment.

FIG. 3 shows a flowchart of a method for increasing the data rate of a bus system, which method is carried out by the subscriber stations 10, 30 of the bus system 1. After the start of the method, the transmitting/receiving device 15 of the subscriber station 10 receives a message and stores it in a corresponding memory device, for example the memory device 13. The flow then proceeds to a step S2.

In step S2, the checking device 12 of the subscriber station 10 checks whether or not the message 42 is intended for the subscriber station 10. In this case, the checking device 12 compares the message identifier 421 of the received message 42 with the message identifier(s) in the list 130. If the message identifier 421 of the received message 42 is contained in the list 130, as is the case with the list 130 shown in FIG. 2, the flow proceeds to a step S3. Otherwise, the flow proceeds to a step S6.

In step S3, that is to say if the message 42 is not intended for the subscriber station 10, the checking device 12 switches off the error handling device 14 of the subscriber station 10. The flow then proceeds to a step S4.

In step S4, it is determined whether the period available for receiving the message 42 in the bus system 1 has expired. If the period has expired, the flow proceeds to a step S5.

In step S5, the checking device 12 switches the error handling device 14 of the subscriber station 10 on again. The flow then returns to step S1.

If a message other than a message 42 has been received, for example the message 43, the flow proceeds to step S6. In step S6, the error handling device 14 determines, during its error handling, whether or not the received message 43 is erroneous. If the received message 43 is erroneous, the flow proceeds to a step S7. Otherwise, the flow proceeds to a step S8.

In step S7, the error handling device 14 transmits an error frame 141 onto the bus line 40 and therefore to the other subscriber stations 20, 30 via the transmitting/receiving device 15 of the subscriber station 10. The flow then returns to step S1.

In step S8, that is to say if the message 43 does not contain an error, the error handling device 14 forwards the message 43 to the communication control device 11 or a corresponding memory device which is accessed by the communication control device 11 in order to process the further data in the message 43 for the subscriber station 10. The flow then returns to step S1.

The method is concluded when the respective subscriber station 10, 30 or the bus system 1 is switched off. In particular, steps S4 and S5 can also be carried out in another manner as long as it is possible to selectively switch the error handling device 14 on and off, as described above.

Therefore, in the present exemplary embodiment, the error handling device 14 and therefore the subscriber station can no longer output an error frame 141 if the subscriber station 20 transmits a message 42 via the bus line 40. In addition, the error handling device 14 can no longer check the message 42 for an error. The error handling device 14 carries out error handling with a check of the received message for an error and output of an error frame if an error is identified in the received message only if the check by the checking device 12 reveals that the received message is intended for the subscriber station 10.

The subscriber station 30 operates in the same manner as the subscriber station 10.

In this manner, transmission of data is no longer terminated by the subscriber stations 10, 30 in the event of an erroneous message in the bus system 1 if said subscriber stations are not involved in the transmission of data.

In addition, it is possible to dispense with the bit timing without the data rate therefore having to be reduced.

As a further modification of the present exemplary embodiment, the checking device 12 can also output the message identifier 411, 421, 431 included in the message 41, 42, 43 to the communication control device 11. The communication control device 11 can therefore set times for sampling one bit of the message 41, 42, 43 on the basis of the message identifier 411, 421, 431 of the respective subscriber station 10, 30, 50 which is included in the message 41, 42, 43. This has the advantage that, for the situation in which bit timing is nevertheless carried out when designing the bus system and a compromise cannot be found for the bit timing, this does not result in the data rate inevitably having to be reduced as a result. In particular, if a plurality of CAN subscribers wish to receive the same CAN-FD signal, individual bit timing corresponding to the CAN ID or the message identifier, which can also be called CAN ID-specific bit timing, is advantageous.

Figure 4:
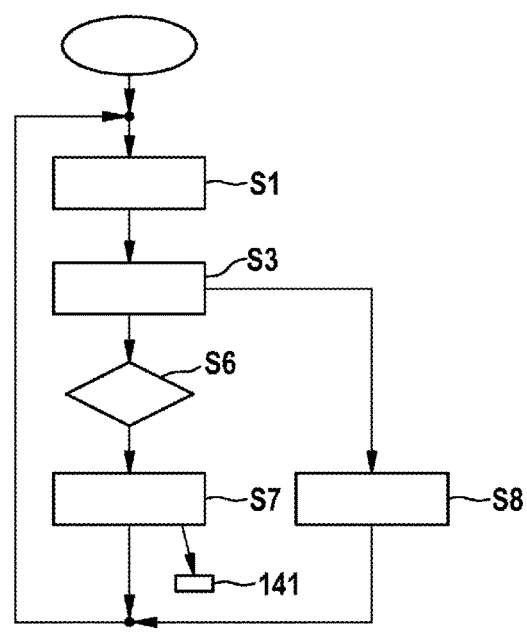
FIG. 4 shows a flowchart of a method according to a second exemplary embodiment.

FIG. 4 illustrates the configuration of the checking device 12 according to a second exemplary embodiment. Accordingly, the checking device 12 completely switches off error handling by the error handling device 14. In this case, step S2 is dispensed with in the method for increasing the data rate, as shown in FIG. 4. In addition, step S6 directly follows step S3. Otherwise, the subscriber station 10 is constructed in the manner described in the first exemplary embodiment.

Such a configuration of the checking device 12 is useful, for example, for intelligent sensors which are not dependent on reliable reception or transmit exclusively messages. Examples of such sensors in a vehicle are, in particular, a rain sensor, an oil pressure sensor, etc.

Figure 5:
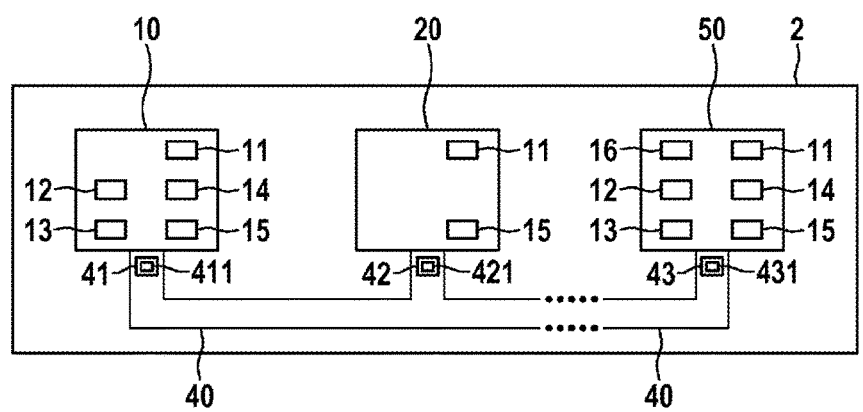
FIG. 5 shows a simplified block diagram of a bus system according to a third exemplary embodiment.

FIG. 5 shows a bus system 2 according to a third exemplary embodiment. In this case, the checking device 12 of a subscriber station 50 uses its memory device 13 to switch the error handling device 14 on and off, as described for steps S2 to S5 with respect to the first exemplary embodiment. However, a further memory device 16 is used for different checking of the messages, for example hiding of particular messages for the subscriber stations 10, 20, 30 for reasons other than for error handling. This has the advantage that erroneous messages which are not required by the subscriber station 10 or could indeed be of interest to the subscriber station 10 for ensuring comfort functionalities do not delay safety-relevant and time-critical messages. For example, the output of an oil pressure sensor or of a lighting function sensor, etc. is not required for a windshield wiper drive.

In contrast, the checking device 12 of the subscriber station 10 uses the memory device 13 both to switch the error handling device 14 on and off and to check the messages, for example hiding of particular messages for the subscriber stations 10, 20, 30 for reasons other than for error handling. In this case, each erroneous message 42, 43 which is processed further by the subscriber station 10 delays the communication of the subsequent messages in the bus system 1.

Otherwise, the bus system 2 according to the third exemplary embodiment is constructed like the bus system 1 in the first exemplary embodiment.

All of the above-described configurations of the bus system 1, 2, the subscriber stations 10, 20, 30, 50 and the method according to the first to third exemplary embodiments can be used individually or in all possible combinations. In particular, the following modifications are additionally conceivable.

The above-described bus system 1, 2 according to the first to third exemplary embodiments is described on the basis of a bus system based on the CAN protocol. However, the bus system 1, 2 according to the first to third exemplary embodiments may also be a different type of communication network. It is advantageous, but is not a necessary prerequisite, for exclusive, collision-free access of a subscriber station 10, 20, 30, 50 to the bus line 40 or to a common channel of the bus line 40 to be ensured in the bus system 1, 2 at least for particular periods.

The bus system 1, 2 according to the first to third exemplary embodiments is, in particular, a CAN network or a CAN-FD network or a LIN network or a FlexRay network.

The number and arrangement of subscriber stations 10, 20, 30, 50 in the bus systems 1, 2 according to the first to third exemplary embodiments are arbitrary. In particular, only subscriber stations 10 or subscriber stations 30 or subscriber stations 50 may also be present in the bus systems 1, 2 in the first to third exemplary embodiments.

In order to achieve an even higher data rate, the data can be transmitted within the CAN frame of the messages 41, 42, 43 in a similar manner to data transmission protocols, for example Ethernet, etc.

The functionality of the exemplary embodiments described above can be implemented in a transceiver or a transmitting/receiving device 15 or transceiver or a CAN transceiver or a transceiver chipset or a CAN transceiver chipset or else in a communication control device 11, etc. Additionally or alternatively, it may be integrated in existing products. In particular, it is possible for the functionality in question to be embedded either in the transceiver as a separate electronic module (chip) or in an integrated overall solution in which only one electronic module (chip) is present.

The invention claimed is:

1. A subscriber station, the subscriber station comprising:
a transmit/receive device configured to be directly connected to a communication bus for communication with a plurality of additional subscriber stations connected directly to the communication bus, the transmit/receive device being configured to:
receive a message transmitted from one subscriber station in the plurality of additional subscriber stations;
identify a bit pattern corresponding to an identifier contained in the message;
hide the message in response to the bit pattern not corresponding to a predetermined bit pattern associated with an identifier of the subscriber station;
check the message for errors based on a cyclical redundancy check (CRC) in response to the bit pattern corresponding to the predetermined bit pattern associated with the identifier of the subscriber station: and
transmit an error message through the communication bus to the plurality of additional subscriber stations indicating an error in response to the message containing an error.

2. The subscriber station as claimed in claim 1, the transmit/receive device being configured to:
output a message identifier of the one subscriber station in the plurality of additional subscriber stations, which is included in the message, to a communication control device of the subscriber station to set times for sampling one bit of the message on the basis of the message identifier to enable the transmit/receive device to receive the message at a data rate corresponding to a data rate of the one subscriber station in the plurality of additional subscriber stations.

3. A bus system comprising:
a bus line; and
a first subscriber station and a second subscriber station connected to one another via the bus line and configured to communicate with one another via the bus line, the first subscriber station comprising:
a transmit/receive device configured to be directly connected to the bus line for communication with the second subscriber station, the transmit/receive device being configured to:
receive a message transmitted from the second subscriber station;
identify a bit pattern corresponding to an identifier contained in the message;
hide the message in response to the bit pattern not corresponding to a predetermined bit pattern associated with an identifier of the first subscriber station;
check the message for errors based on a cyclical redundancy check (CRC) in response to the bit pattern corresponding to the predetermined bit pattern associated with the first subscriber station; and
transmit an error message through the bus line to the second subscriber station indicating an error in response to the message containing an error.

4. A method for operating a subscriber station in a bus system comprising:
receiving, with a transmit/receive device in the subscriber station directly connected to a communication bus for communication with a plurality of additional subscriber stations, a message transmitted from one subscriber station in the plurality of additional subscriber stations;
identifying, with the transmit/receive device, a bit pattern corresponding to an identifier contained in the message;
hiding, with the transmit/receive device, the message in response to the bit pattern not corresponding to a predetermined bit pattern associated with an identifier of the subscriber station;
checking, with the transmit/receive device, the message for errors based on a cyclical redundancy check (CRC) in response to the bit pattern corresponding to the predetermined bit pattern associated with the subscriber station; and
transmitting, with the transmit/receive device, an error message through the communication bus to the plurality of additional subscriber stations indicating an error in response to the message containing an error.

5. The subscriber station of claim 1 wherein the transmit/receive device is configured to be directly connected to a Controller Area Network (CAN) bus.

6. The bus system of claim 3 wherein the bus system is a Controller Area Network (CAN) bus system.

7. The bus system of claim 3, the transmit/receive device of the first subscriber station being further configured to:
output a message identifier of the second subscriber station, which is included in the message, to a communication control device of the first subscriber station to set times for sampling one bit of the message on the basis of the message identifier to enable the transmit/receive device to receive the message at a data rate corresponding to a data rate of the second subscriber station.

8. The method of claim 4 further comprising:
outputting, with the transmit/receive device, a message identifier of the one subscriber station in the plurality of additional subscriber stations, which is included in the message, to a communication control device of the subscriber station to set times for sampling one bit of the message on the basis of the message identifier to enable the transmit/receive device to receive the message at a data rate corresponding to a data rate of the one subscriber station in the plurality of additional subscriber stations.

* * * * *

UNITED STATES PATENT AND TRADEMARK OFFICE
CERTIFICATE OF CORRECTION

PATENT NO. : 10,216,687 B2  
APPLICATION NO. : 15/119210  
DATED : February 26, 2019  
INVENTOR(S) : Ralf Machauer et al.

Page 1 of 1

It is certified that error appears in the above-identified patent and that said Letters Patent is hereby corrected as shown below:

In the Claims

In Column 9, Lines 22-24, Lines 17-19 of Claim 1 should read:
pattern corresponding to the predetermined bit pat-
tern associated with the identifier of the subscriber
station; and Signed and Sealed this
Thirtieth Day of April, 2019

Andrei Iancu
*Director of the United States Patent and Trademark Office*